United States Patent [19]

Chlebina et al.

[11] Patent Number: 5,425,835
[45] Date of Patent: Jun. 20, 1995

[54] TREAD APPLICATION APPARATUS

[75] Inventors: Lawrence E. Chlebina, Akron; William J. Head, Ravenna; Donald C. Kubinski, Medina, all of Ohio

[73] Assignee: The Goodyear Tire & Rubber Company, Akron, Ohio

[21] Appl. No.: 311,233

[22] Filed: Sep. 23, 1994

Related U.S. Application Data

[62] Division of Ser. No. 222,763, Apr. 1, 1994, Pat. No. 5,380,383.

[51] Int. Cl.⁶ .............................................. B29D 30/52
[52] U.S. Cl. .............................. 156/406.2; 156/406.6; 156/421.8; 156/909
[58] Field of Search .................. 156/406.2, 406.6, 909, 156/394.1, 96, 126, 127, 128.1, 128.6, 129, 412, 421.8

[56] References Cited

U.S. PATENT DOCUMENTS

| | | | |
|---|---|---|---|
| 1,162,425 | 11/1915 | Wilcox | 156/421 |
| 1,785,689 | 12/1930 | State | 156/421.8 |
| 2,936,813 | 5/1960 | Haase | 156/421 |
| 3,097,984 | 7/1963 | Godfrey | 156/96 |
| 3,212,951 | 10/1965 | Porter | 156/421 |
| 3,397,099 | 8/1968 | Barefoot | 156/96 |
| 3,815,651 | 6/1974 | Neal | 152/187 |
| 3,923,390 | 12/1975 | Susko | 353/95 |
| 3,976,532 | 8/1976 | Barefoot | 156/96 |
| 4,036,677 | 7/1977 | Maranzoni | 156/394 |
| 4,088,521 | 5/1978 | Neal | 156/96 |
| 4,106,965 | 8/1978 | Lee | 156/121 |
| 4,178,198 | 12/1979 | Kent | 156/96 |
| 4,626,300 | 12/1986 | Barefoot | 156/96 |
| 4,684,422 | 8/1987 | Roedseth | 156/406.2 |
| 4,820,373 | 4/1989 | Klose | 156/128 |
| 4,957,574 | 9/1990 | Clayton et al. | 156/126 |
| 4,957,575 | 9/1990 | Cronin | 156/126 |

FOREIGN PATENT DOCUMENTS

812155  4/1959  United Kingdom ................ 156/127

*Primary Examiner*—Geoffrey L. Knable
*Attorney, Agent, or Firm*—David L. King

[57] ABSTRACT

An improved method for mounting an annular tread 1 onto a tire casing 2 is described. The improved method comprises the steps of expanding the tread 1 radially and encircling the expanded tread with a transfer mechanism 30. The transfer mechanism 30 has a means 90 for holding the lateral edges 5 of the tread 1 in the expanded condition independent of the center 6 of the tread 1. The means 90 for holding the lateral edges 5 of the tread 1 is accomplished without contacting the radially inner surface 7 of the tread 1. The transfer mechanism 30 has a means 92 for circumferentially clamping the central portion of the tread 1 to the casing 2. The transfer mechanism 30 with expanded tread 1 is centered over the casing 2. The means 92 for clamping the central portion 6 of the tread 1 is actuated while holding the lateral edges 5 of the tread 1 in the transfer mechanism 30. Then the lateral edges 5 of the tread 1 are released from the transfer mechanism 30 thereby transferring the tread 1 to the casing 2 while preventing entrapment of air between the casing 2 and the tread 1.

9 Claims, 21 Drawing Sheets

TREAD APPLICATION APPARATUS

This is a division of application Ser. No. 08/222,763, filed Apr. 1, 1994, now U.S. Pat. No. 5,380,383.

BACKGROUND OF THE INVENTION

1. Field of Invention

The present invention relates generally to a method and apparatus for applying an endless annular tread to a tire casing, and more specifically, to a method and apparatus for transferring a tread onto a tire casing.

2. Description of the Related Art

Annular treads are commonly used in truck tire retreading. Such an annular tread is disclosed in U.S. Pat. No. 3,815,651 to Neal. Annular treads as disclosed in the Neal patent have a relaxed diameter less than the inflated diameter of the tire casing. These annular treads must be stretched radially outwardly to be fitted over the tire casing. Machinery directed to this process has been disclosed in U.S. Pat. No. 4,957,575 to Robert A Chronin et al. Chronin disclosed a method of clamping an annular tread to a pneumatic tire casing wherein the casing was mounted on a wheel and the tread on a tread expander assembly. The tread expander assembly is moved along a line coincident with or parallel to the wheel rotational axis. The tread expander assembly has a means expandable outwardly and retractable inwardly along the radial direction of the wheel for selectively stretching a tread by radially outward displacement of the tread at a number of spaced points on the radially inner side of the tread. By actuating the tread expander, the tread is expanded to a size sufficient to circumferentially surround the casing. Chronin then teaches the step of moving the tread toward the casing to a position where the stretched, annular tread circumferentially surrounds and is centered on the casing. Chronin then teaches that by encircling the casing and the stretched tread with a clamping assembly, the assembly having a plurality of space clamping means and, using such assembly and without rotating the casing or the tread relative to such clamping assembly, clamping the stretched tread to the casing by sequentially or simultaneously pressing on the radially outward most surface of the tread at spaced clamping points. Each clamping point is located between points where the stretching forces apply. Chronin then unclamps the stretched tread at the clamping points and transfers the annular tread from the tread expander assembly onto the casing by moving the tread expander assembly axially away from the casing. The Chronin device requires that the undertread surface or radially inner surface of the tread and the radially outer surface of the casing are contacted by the stretching means of the tread expander assembly. The application of a precured tread to a casing many times involves an adhesive coating to be applied at the mating surfaces of the casing and the tread. The prior art devices are in direct contact with these mating surface areas and inherently must contact these adhesives upon transferring the tread to the casing.

The present invention will accurately center the tread on the casing while insuring that the tread stays firmly centered on the casing during the transfer of the tread to the casing without requiring any physical contact with the radially inner surface of the tread or the radially outward surface of the casing in the region where the two components are to be joined.

SUMMARY OF THE INVENTION

An improved method for mounting an annular tread 1 onto a tire casing 2 is described. The improved method comprises the steps of expanding the tread 1 radially and encircling the expanded tread 1 with the transfer mechanism 30. The transfer mechanism 30 has a means 90 for holding the lateral edges 5 of the tread 1 in the expanded condition independent of the center 6 of the tread 1. The means 90 for holding the lateral edges 5 of the tread 1 is accomplished without contacting the radially inner surface 7 of the tread 1. The transfer means 30 further includes a means 92 for circumferentially clamping the central portion 6 of the tread 1 to the casing 2. The transfer mechanism 30 with expanded tread 1 is centered over the casing 2. The means 92 for clamping the central portion 6 of the tread 1 is actuated while the lateral edges 5 of the tread 1 are held in place in the transfer mechanism 30. The lateral edges 5 of the tread 1 are then released thereby transferring the tread 1 to the casing 2 while preventing entrapment of air between the casing 2 and the tread 1.

BRIEF DESCRIPTION OF THE DRAWINGS

Other aspects of the invention will become apparent from the following description when read in conjunction with the accompanying drawings wherein.

DEFINITIONS

The invention also may be better understood in the context of the following definitions, which are applicable both to the specification and the appended claims.

"Axial" is used herein to refer to lines or directions that are parallel to the axis of rotation of the casing or wheel.

"Bead" means that part of the casing comprising an annular tensile member wrapped by ply cords and shaped, with or without other reinforcement elements such as flippers, chippers, apexes, toe guards and chafers, to fit the design rim.

"Casing" means the carcass, belt structure, beads, sidewalls, and all other components of the tire excepting the tread and undertread. The casing may be new, unvulcanized rubber or previously vulcanized rubber to be fitted with a new tread.

"Equatorial plane (EP)" or "Circumferential Plane" means the plane perpendicular to the casing or tread's axis of rotation and passing through the center.

"Lateral" or "laterally" means of or pertaining to the side, situated at, directed toward, or coming from, the side.

"Pneumatic tire" means a laminated mechanical device of generally toroidal shape (usually an open torus) having beads and a tread and made of rubber, chemicals, fabric and steel or other materials. When mounted on the wheel of a motor vehicle, the tire through its tread provides a traction and contains the fluid that sustains the vehicle load.

"Radial" and "radially" means directions radially toward or away from the axis of rotation of the casing or wheel or tread.

"Sidewall" means that portion of a tire between the tread and the bead.

"Tread" means a molded rubber component which, when bonded to a tire casing, includes that portion of the tire which comes into contact with the road when the tire is normally inflated and under normal load.

"Tread width" means the arc length of the tread surface in the axial direction, that is, in a plane passing through the axis of rotation of the tire.

DETAIL DESCRIPTION OF THE PREFERRED EMBODIMENT

Figure 1:
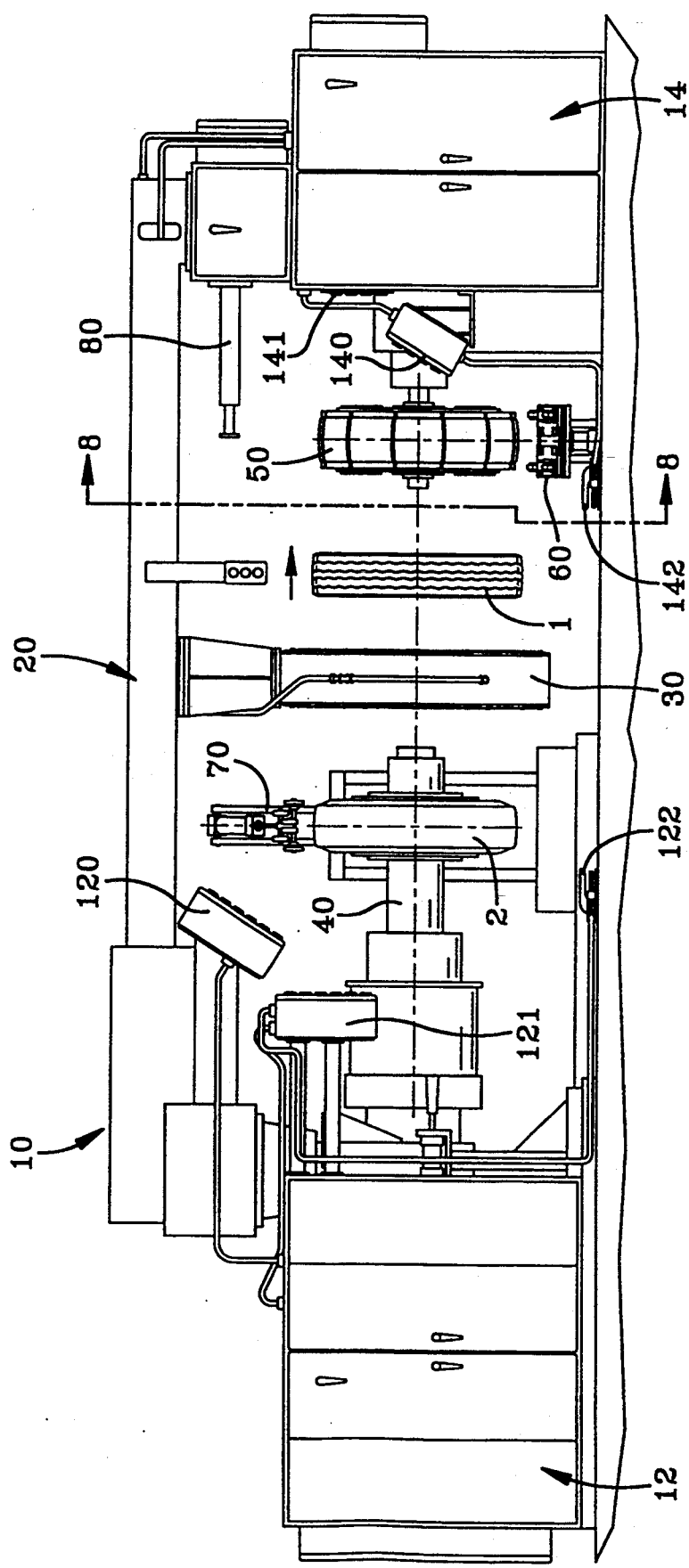
FIG. 1 is a front view of the machine 10 for applying an annular tread 1 to a tire casing 2, the annular tread 1 and casing 2 are also depicted.

In the drawings, the same numerals are used for the same components or items in the several views. With particular reference now to FIG. 1, there is illustrated a tread applying machine 10. This tread applying machine is made up of several subcomponents or elements. These elements are connected by a frame 20. The frame may be constructed of any material with sufficient strength and rigidity to support the suspended weight and operation of the tread applying machine 10. In the preferred embodiment, a connecting frame 20 includes an overhead top member 24 which is connected to a tread expander assembly 50 and a tire drum assembly 40. The rigid top horizontal member 24 has an internal channel to which a tread transfer mechanism 30 is slidably attached.

Figure 16:
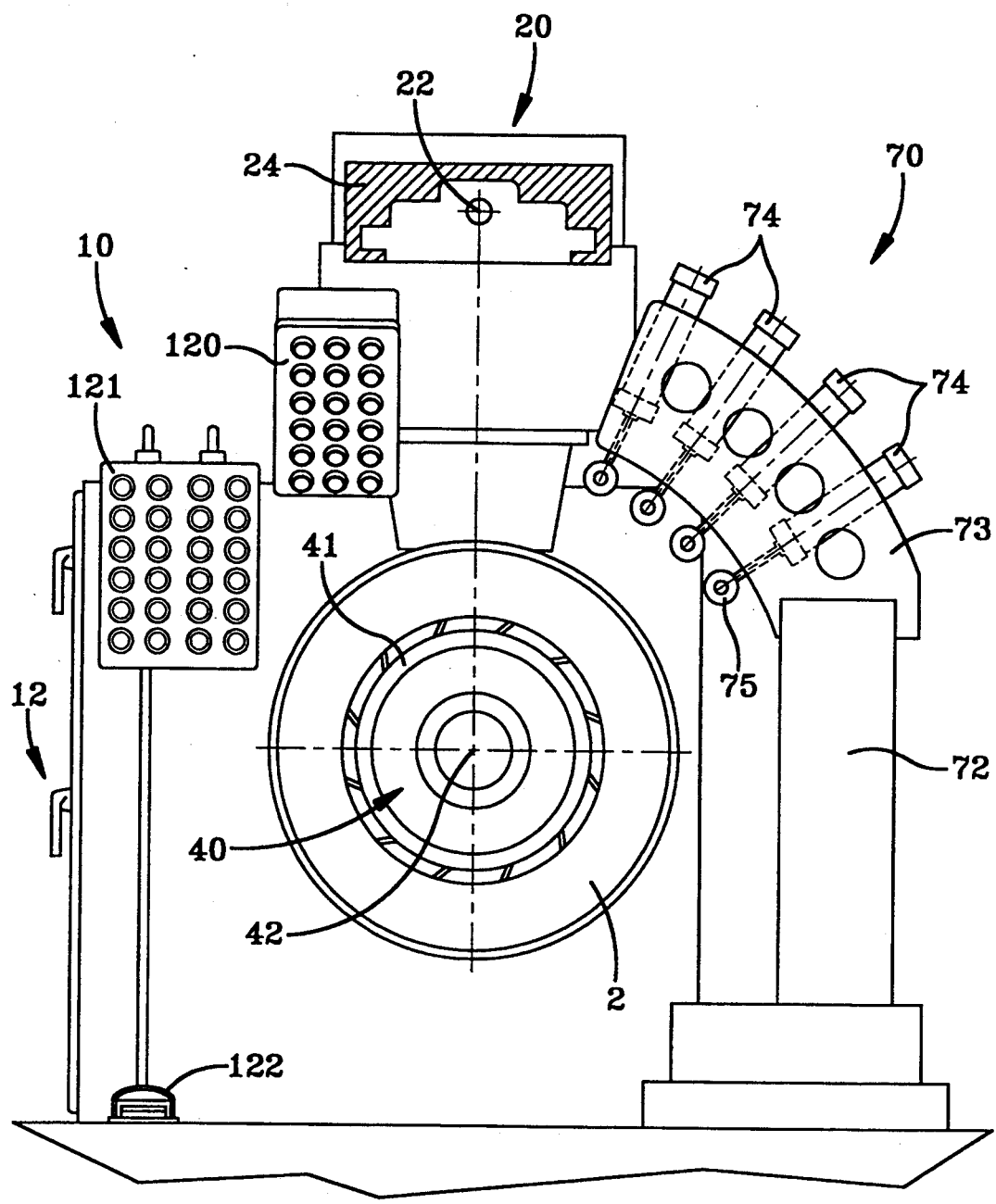
FIG. 16 is a view of the machine 10 depicting the tire 1 and tire drum assembly 40 taken along lines 16—16 of FIG. 4.

At the left hand side of FIG. 1 is illustrated a casing drum wheel assembly 40. The assembly 40 includes a cabinet 12 which houses the electrical and hydraulic power units that drive the casing drum wheel assembly 40. Connected electrically to the cabinets are control panels 120 and 121. Working in cooperation with the control panels is illustrated a foot switch 122. Positioned directly behind and above the casing drum wheel 41 is illustrated a tread stitcher mechanism 70. With reference to FIG. 16 an end view depicting the casing drum wheel assembly 40 is illustrated. A tire casing 2 is attached to the drum wheel 41. The drum wheel 41 is accordingly attached to an axle 42. The axle 42 is power driven and capable of rotating the wheel 41. Rotation of the axle 42 is controlled at the control panel 121.

A tread stitcher mechanism 70 is also illustrated in FIG. 16. The stitcher mechanism is pivotally attached to a vertical member 72 at the upper frame portion 73. Attached to the upper frame portion 73 are four pneumatic cylinders 74. Connected to each cylinder is a plurality of stitching wheels 75.

With reference to FIG. 1, to the right of the casing wheel assembly 40 is illustrated a tread transfer mechanism 30. Next to the tread transfer mechanism 30 is illustrated a tread 1. To the right of the tread 1 is illustrated the tread expander assembly 50.

The tread expander assembly 50 includes a cabinet 14 which houses electronic and hydraulic power units which are electrically connected to control panels 140 and 141. Connected to the control panel 140 is a foot switch 142 which works in cooperation with the control panel 140. A tread centering device 60 is illustrated directly below and to the rear of the expandable wheel portion 51 of the tread expander 50 directly above the tread expander wheel 51 is illustrated a mechanical stop 80.

Figure 8:
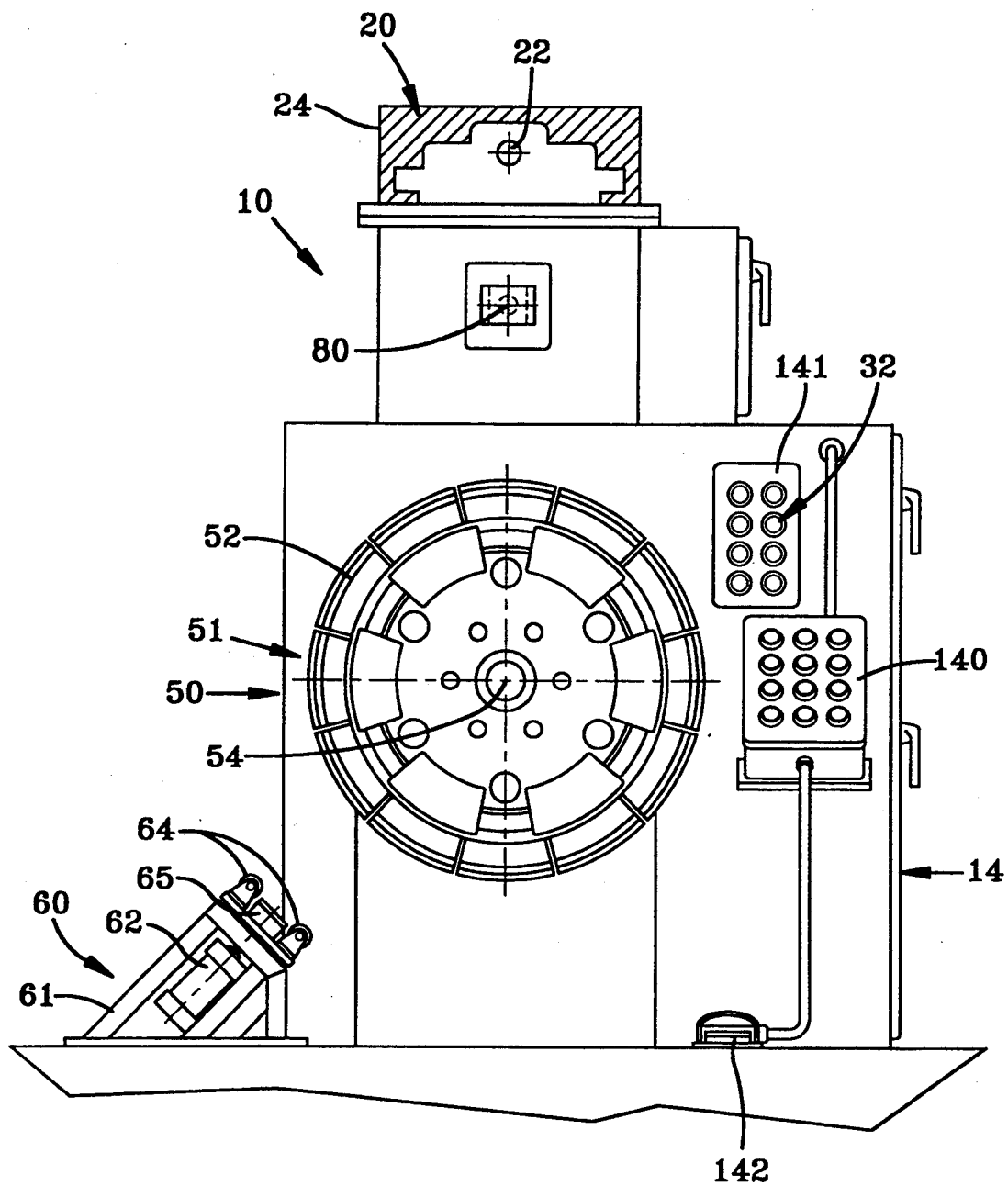
FIG. 8 is a view taken along line 8—8 of FIG. 1 and depicts the tread expander assembly 50 centering mechanism 60, and control cabinet 14 control panels 140,141 of the machine 10.

With reference to FIG. 8 there is illustrated an end view of the tread expander assembly 50 illustrating the control cabinet 14, the control panels 141 and 140, and foot switch 142 as well as the rotatable expandable wheel 51. The rotatable expandable wheel 51 comprises a plurality of radially extendable members 52. The members 52 are attached to the wheel 51 and can be radially extended or retracted. The wheel 51 is attached to an axle 54. The axle 54 is capable of rotating the wheel 51. A tread centering device 60 is illustrated in FIG. 8. The device 60 has a rigid frame 61 to which a pneumatic cylinder 62 is attached. Attached to the cylinder is a support member 65 attached to the support member 65 are four centering wheels 64 two wheels 64 are positioned on each side of the expander wheel 51.

The best mode of practicing the method of transferring and applying a tread to a casing is shown in sequential steps by the various figures.

Figure 2:
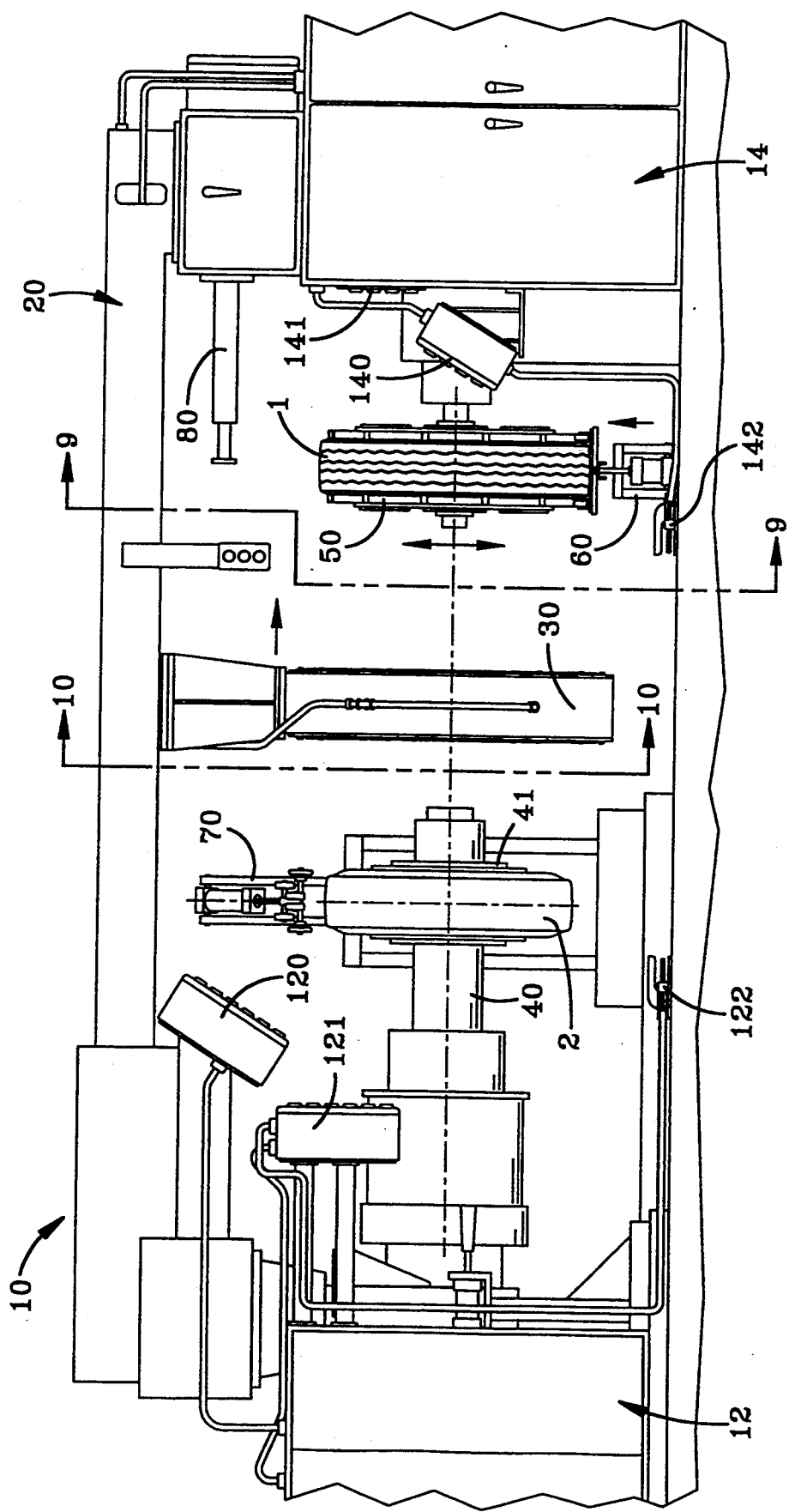
FIG. 2 is an enlarged front view of the machine 10 with the casing 2 mounted on a tire drum assembly 40 and the tread mounted on a tread expander assembly 50.
Figure 9:
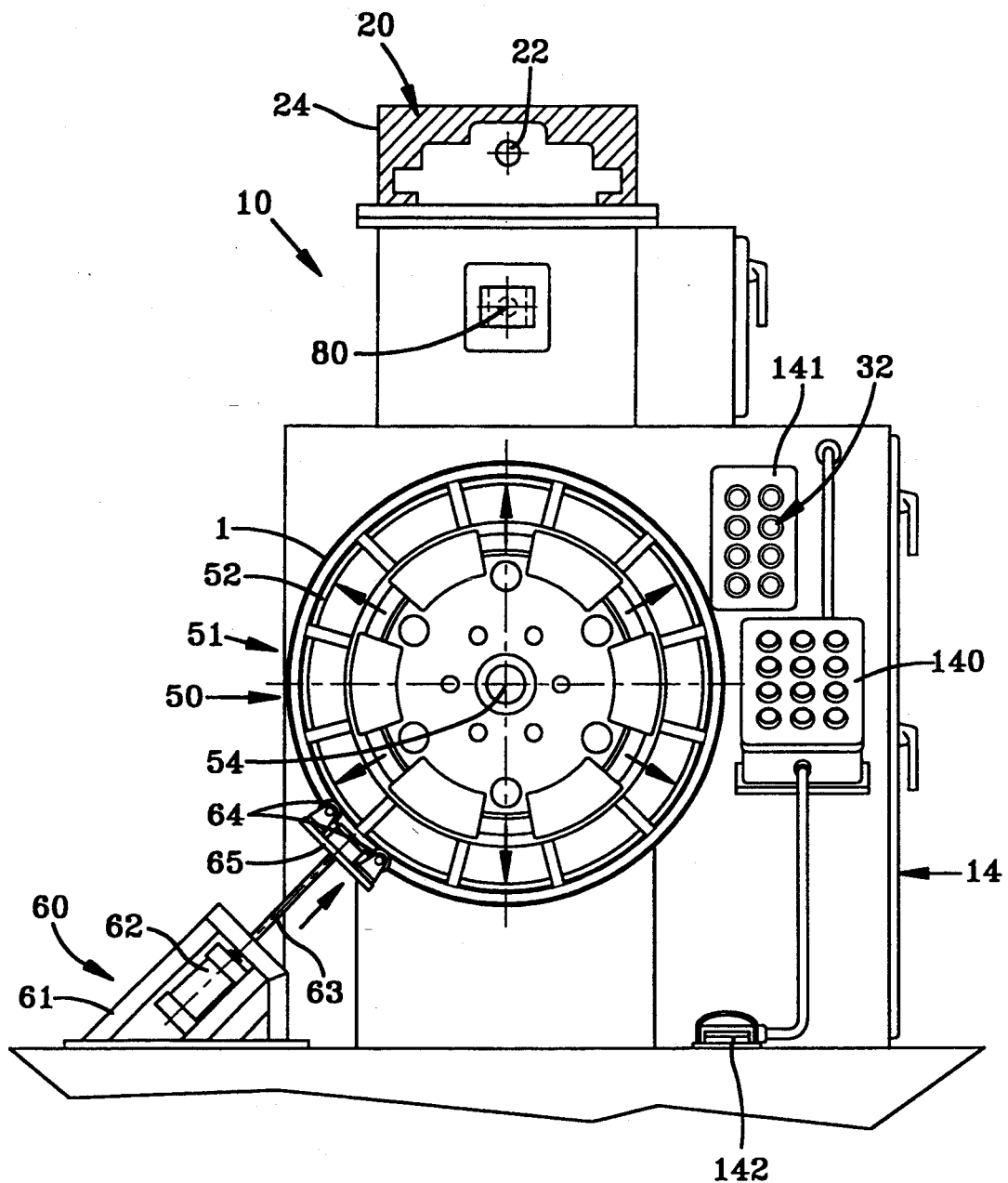
FIG. 9 is a view of the machine 10 taken along lines 9—9 of FIG. 2.

As illustrated in FIG. 1, the casing 2 has first been attached to the casing drum wheel 41. In FIG. 2, the tread is then shown mounted onto the retracted expandable wheel 51 with reference to FIG. 2 it can be observed that the expandable wheel 51 is radially extended thereby stretching the tread 1. Once the tread has been stretched on the expandable wheel 51, the wheel 51 is then rotated. With reference to FIG. 9, as the wheel is rotated, the tread centering device 60 is extended to engage the lateral edges 5 of the tread 1. The tread centering device 60 engages the rotating tread 1 and orients the tread edges 5 perpendicular to the axis of rotation of the tread expander wheel 51. Once the tread 1 has been centered after a few rotations of the tread expander wheel 51, the centering device 60 is retracted from contact with the tread 1.

Figure 3:
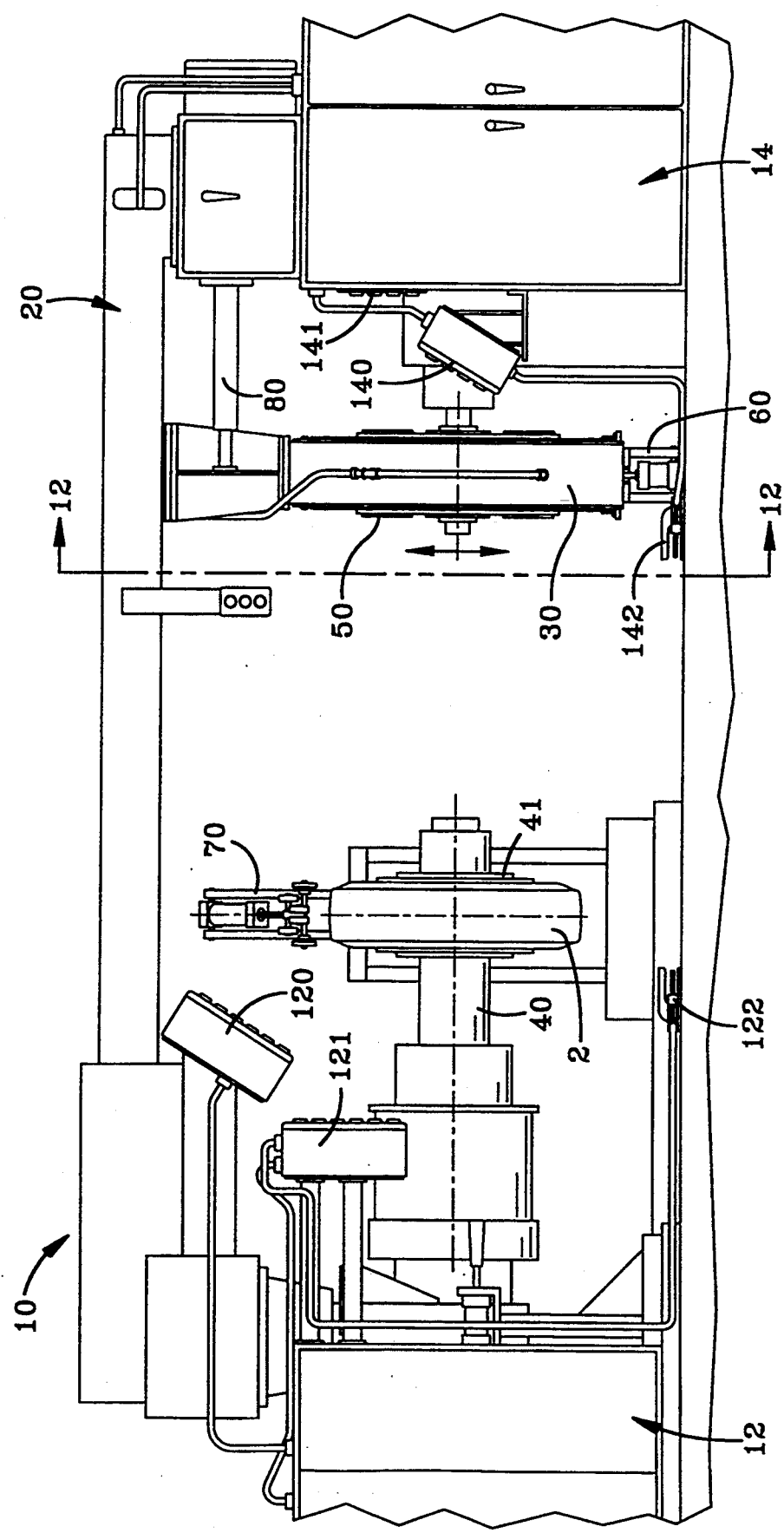
FIG. 3 is a front view of the machine 10 showing the transfer mechanism 30 encircling the expanded tread 1.
Figure 10:
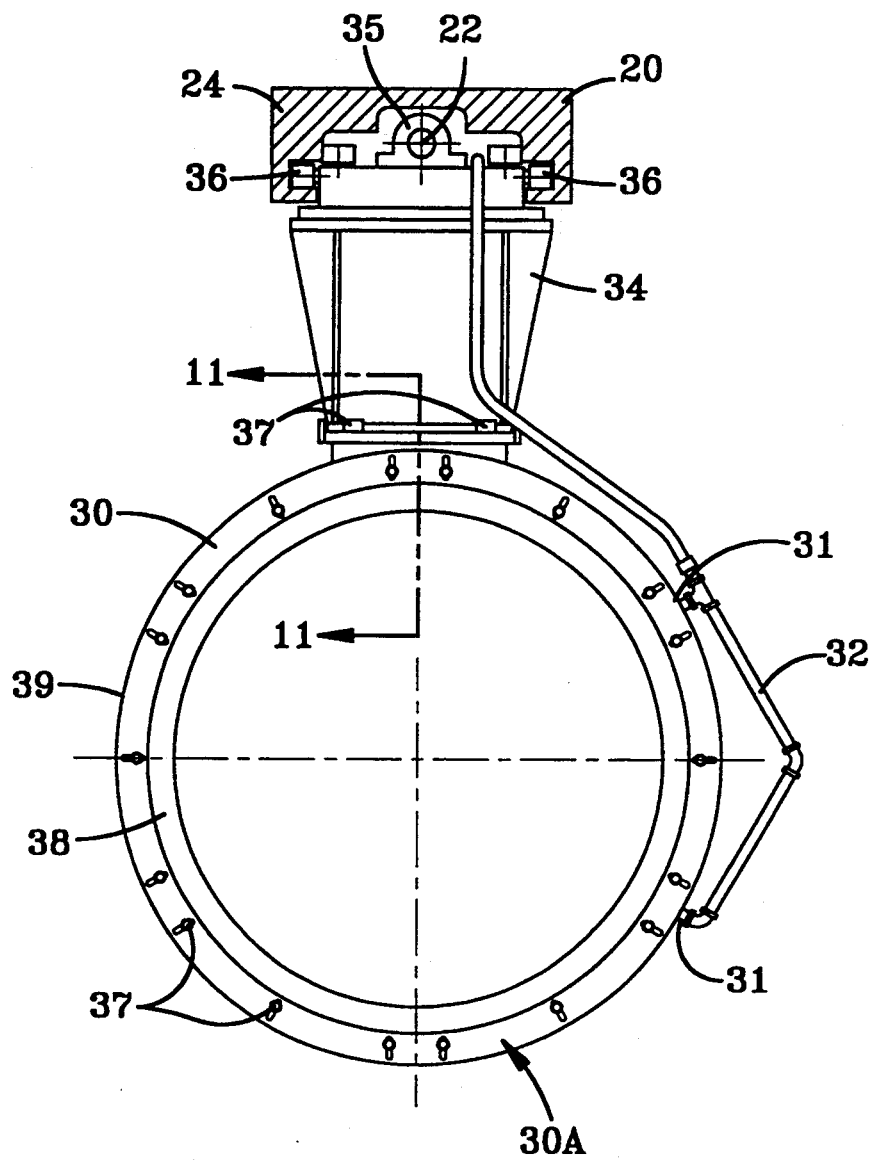
FIG. 10 is a view taken along lines 10—10 of FIG. 2 and depicts the transfer mechanism 30.
Figure 11:
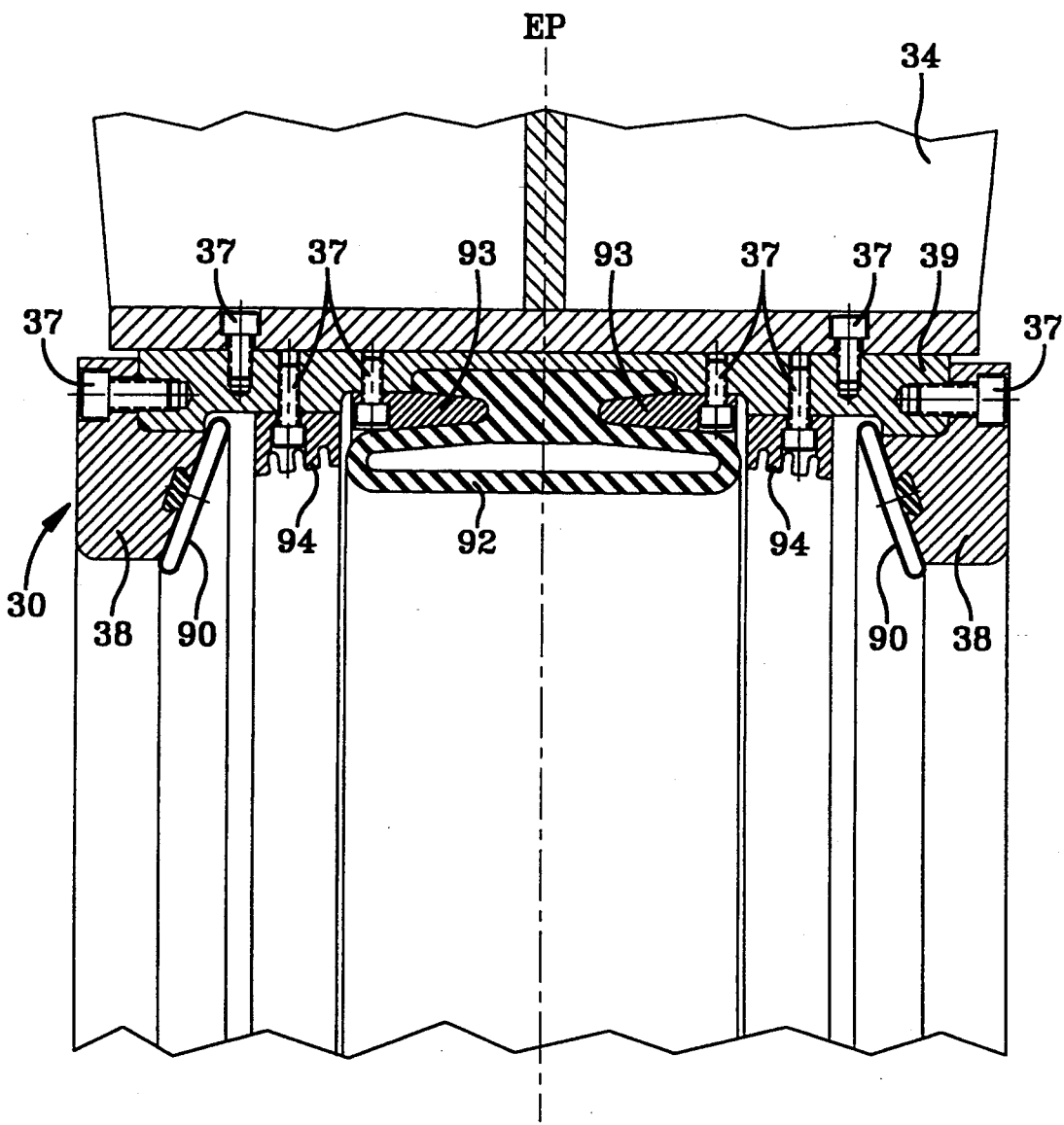
FIG. 11 is a cross sectional view of the transfer mechanism 30 as taken along lines 11—11 of FIG. 10.
Figure 12:
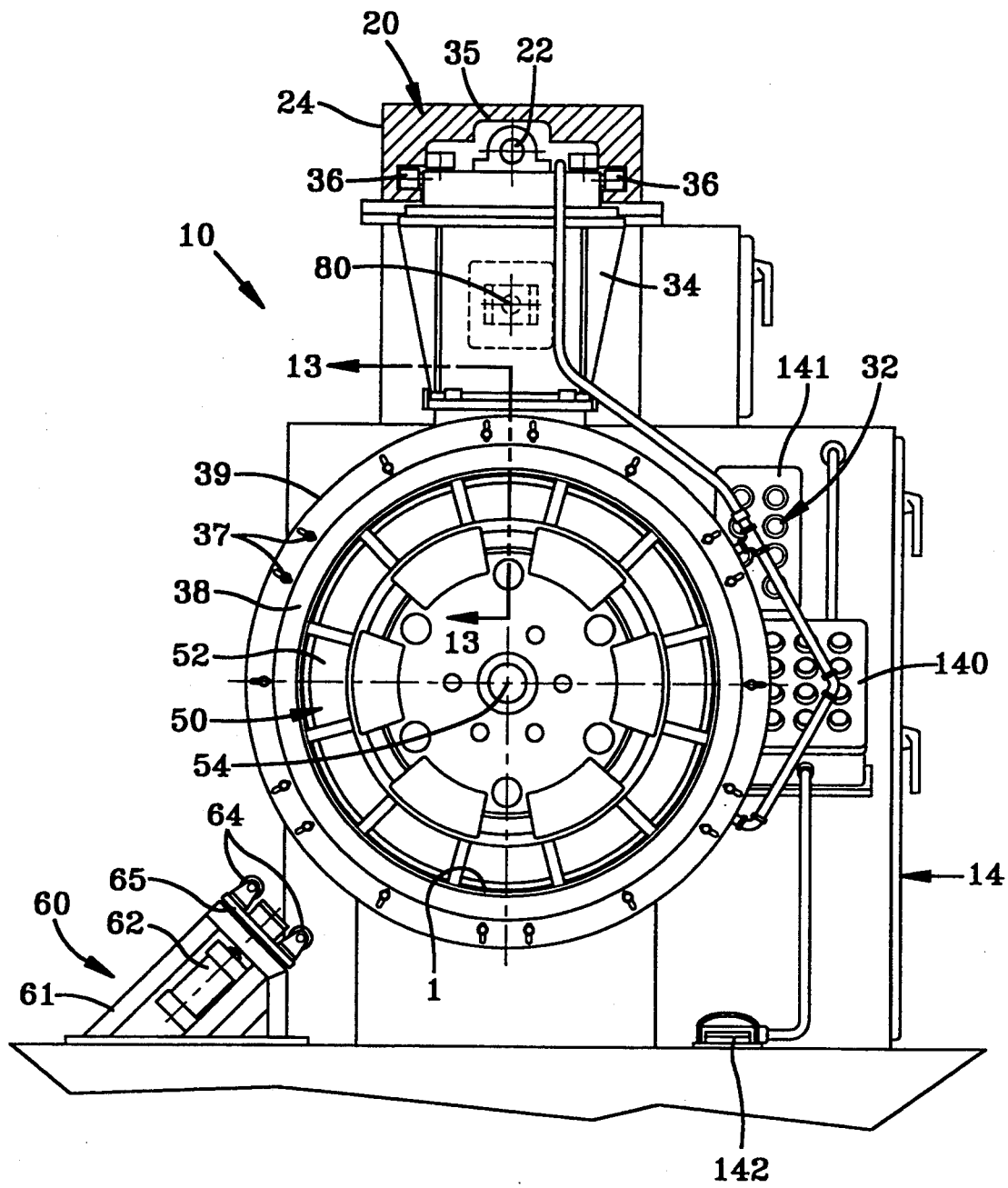
FIG. 12 is a view taken along lines 12—12 of FIG. 3.

With the tread properly positioned on the expanded wheel 51, the operator then moves the tread transfer mechanism 30 encircling the expanded tread 1. The mechanism is moved until it contacts the mechanical stop 80 as illustrated in FIGS. 3 and 12. The transfer mechanism may be moved into position by sliding the mechanism 30 or, as is illustrated in the preferred embodiment, the operator may actuate a switch 32 which will cause a worm gear 22 to rotate thereby driving the mechanism 30 into proper position. This can be seen with reference to FIGS. 3 and 10. As the transfer mechanism 30 is mechanically attached to a frame 24 which has a pair of bearing surfaces 36 encased within a channel of the horizontal member 24. The worm gear 22 is threadingly engaged to the upper member 35 which is rigidly attached to the frame 34. As the gear 22 turns, the entire mechanism is then driven along the gear 22. Alternatively, the transfer mechanism may be slidably moved by an air latching cylinder or a chain drive mechanism. Rigidly attached to the frame 34 is a vacuum ring assembly 30A which comprises an annular center portion 39 and a pair of lateral side portions 38 which are rigidly attached by means of threaded fasteners 37 spatially positioned around the circumference of the assembly. A vacuum line 32 is connected to the vacuum ring 30A at two air fitting locations 31. With reference to FIG. 12, an end view is illustrated wherein the transfer mechanism 30 is shown encircling the expandable wheel assembly 50 with tread 1 mounted thereto.

Figure 13:
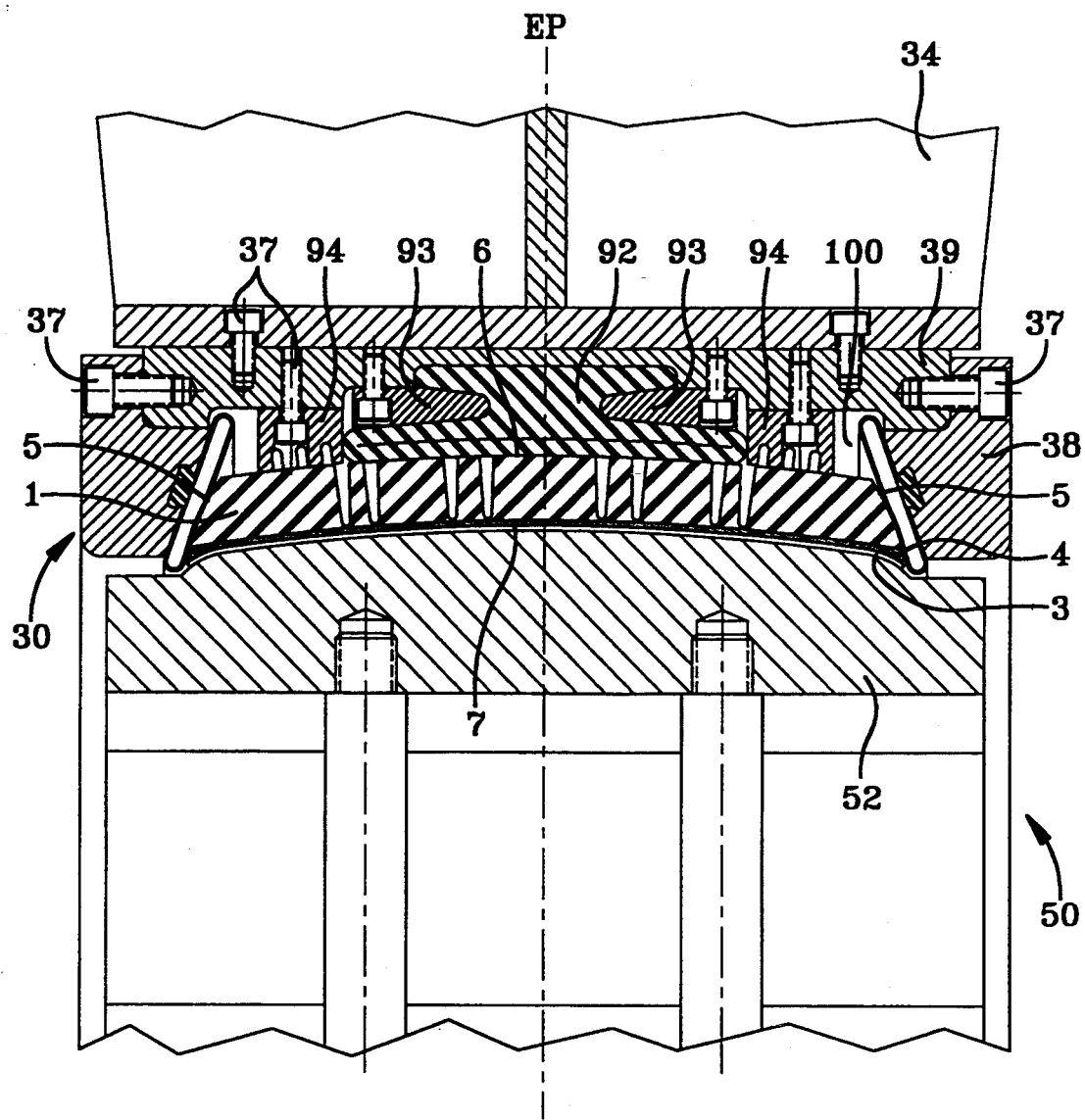
FIG. 13 is a cross sectional view of the transfer mechanism 1, tread In and expander assembly 50 taken along lines 13—13 of FIG. 12.
Figure 14:
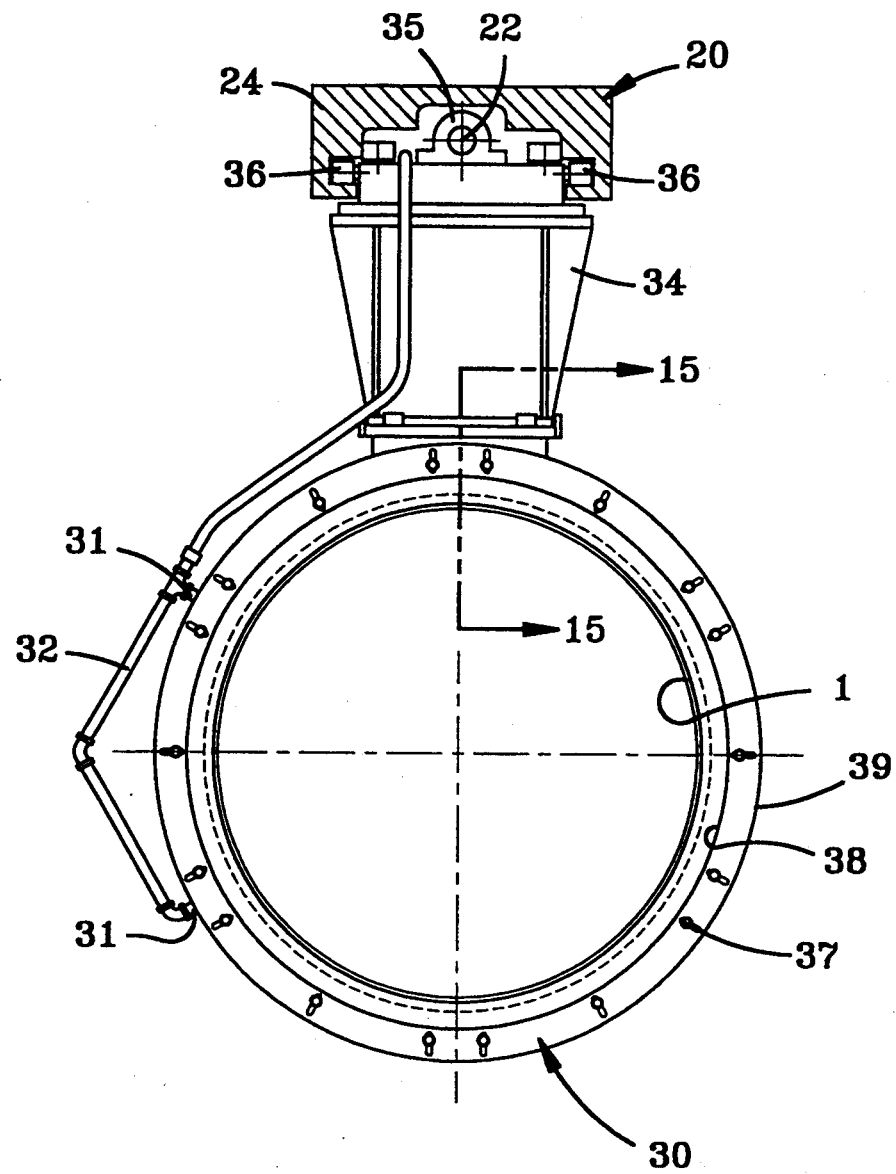
FIG. 14 is a view of the transfer mechanism 30 taken along the lines of 14—14 of FIG. 4.

With reference to FIG. 13, once the tread transfer mechanism 30 is positioned over the expanded tread, the expandable wheel 51 is further extended radially outwardly such that the radially expandable members 52 push the tread into the transfer mechanism. The tread as illustrated in FIG. 13 is precoated with an adhesive 4 on the radially inner surface 7 of the tread 1 and is covered with a poly liner 3. The expandable member 52 is in direct contact with the poly liner 3. Once the tread 1 is pushed into the transfer mechanism 30, the lateral edges 5 are then contacted by inflating holding means 90 against lateral edges 5. The holding means 90 in the preferred embodiment comprises a pair of inflatable annular bladders that are attached to the side portions 38. In the central portion of the transfer mechanism 30 is illustrated a clamping means 92. The clamping means 92 is shown in a compressed condition as illustrated in FIG. 13.

Figure 4:
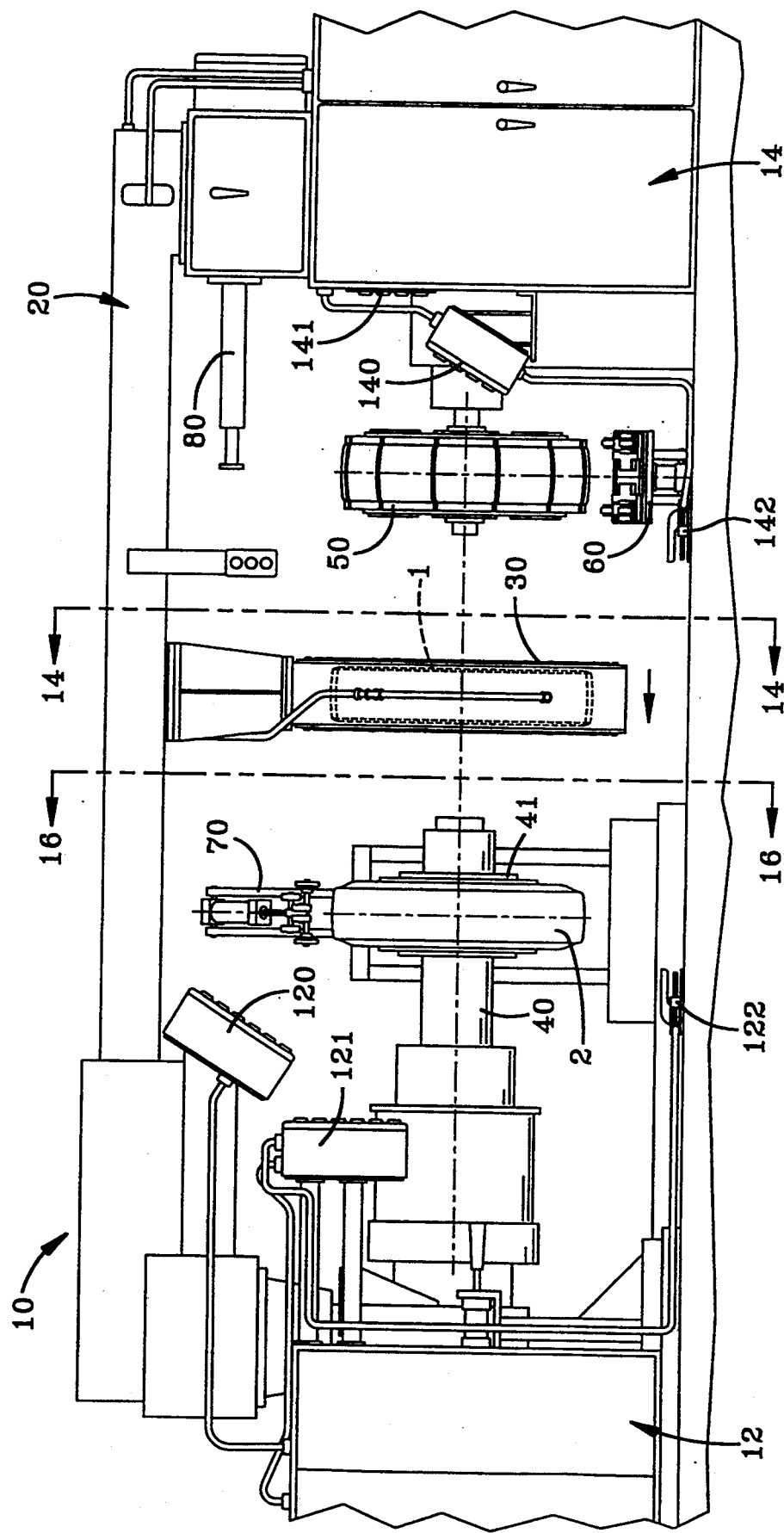
FIG. 4 is a front view of the machine 10 depicting the expanded tread 1 within the transfer mechanism 30.

As shown in FIG. 13, the clamping means 92 are securely held by two annular rings 93 which are fastened by way of threaded fasteners 37 to the central portion 39 of the transfer mechanism 30. Adjacent each side of the clamping means 92 is circumferentially grooved annular rings 94 these rings 94 are in communication with a means for evacuating air between the tread 1 and the transfer mechanism 30. As illustrated in FIG. 13, when the tread is pushed into the transfer mechanism an air chamber is formed between the tread and the transfer mechanism. The air chamber is illustrated by reference numeral 100. In the preferred method of practicing the invention, a vacuum is pulled withdrawing air from the air chamber 100. Because the tread 1 is annularly sealed at both tread edges 5 by the holding means 90, a large surface area is available for creating a sufficient force to maintain a tread 1 in a radially expanded condition. Due to the large surface area it is believed that a one-way check valve alternatively could be employed such that when the tread 1 is pushed into the mechanism 30 the air between the tread and the transfer mechanism could be pushed outward and the resulting vacuum created between the tread 1 and the transfer mechanism 30 would naturally occur with a slight retraction of the tread radially inwardly. This retraction is believed to be sufficiently small that the tread 1 would be maintained in the transfer mechanism 30, assuming alignment can be maintained. However, it is preferred to exert a vacuum insuring that the tread 1 remains in the aligned and extended position. It currently requires only approximately 6–7 in. Hg vacuum to maintain the tread 1 in a fully expanded position within the transfer mechanism 30. Once the tread 1 has been transferred to the transfer mechanism 30, the radially expanded wheel is retracted radially inwardly. The transfer mechanism is then freed to be moved to the drum casing wheel assembly as illustrated in FIG. 4.

Figure 5:
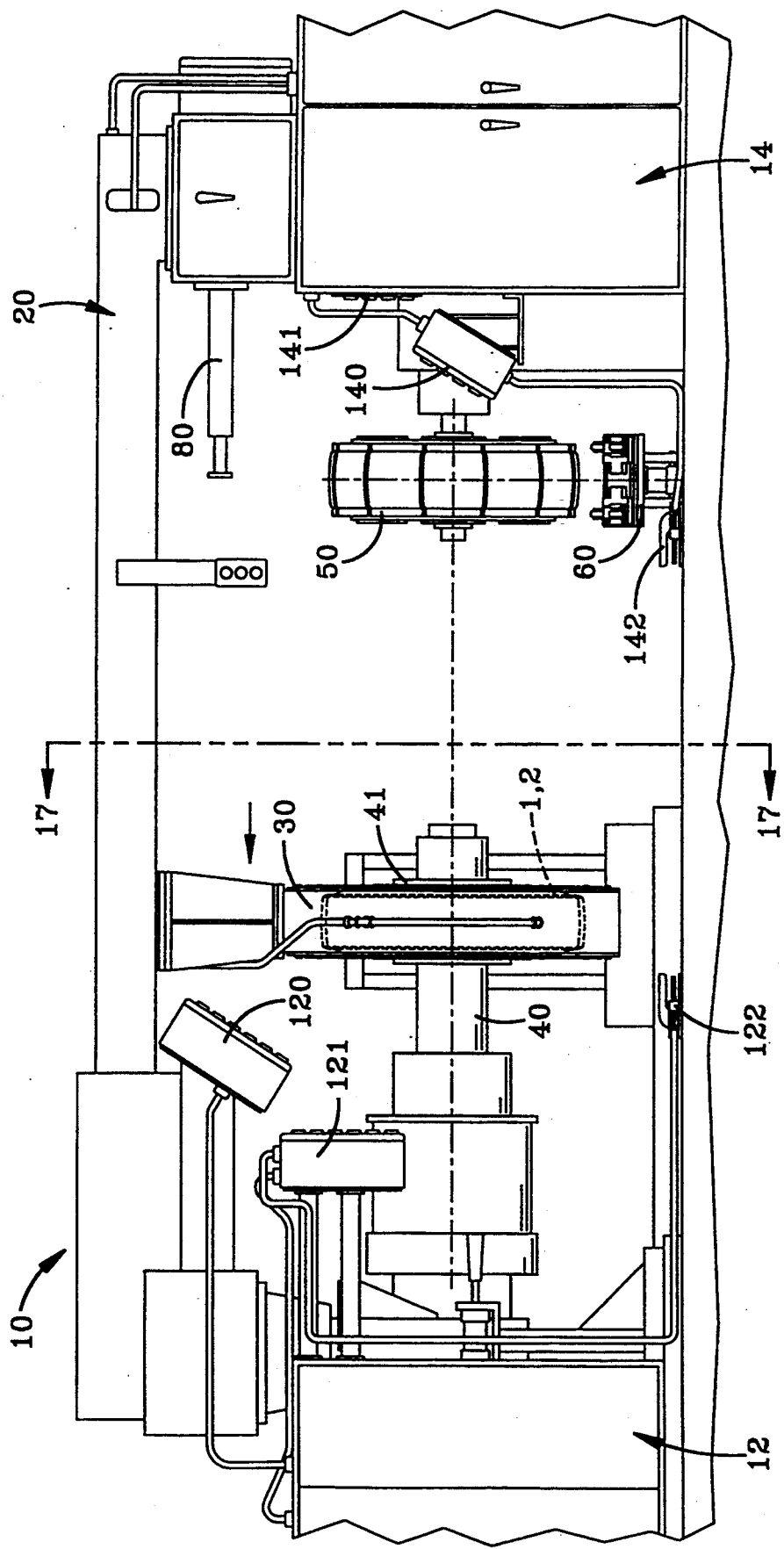
FIG. 5 is a front view of the machine 10 showing the transfer mechanism 30 with expanded tread 1 encircling the casing 2.
Figure 15:
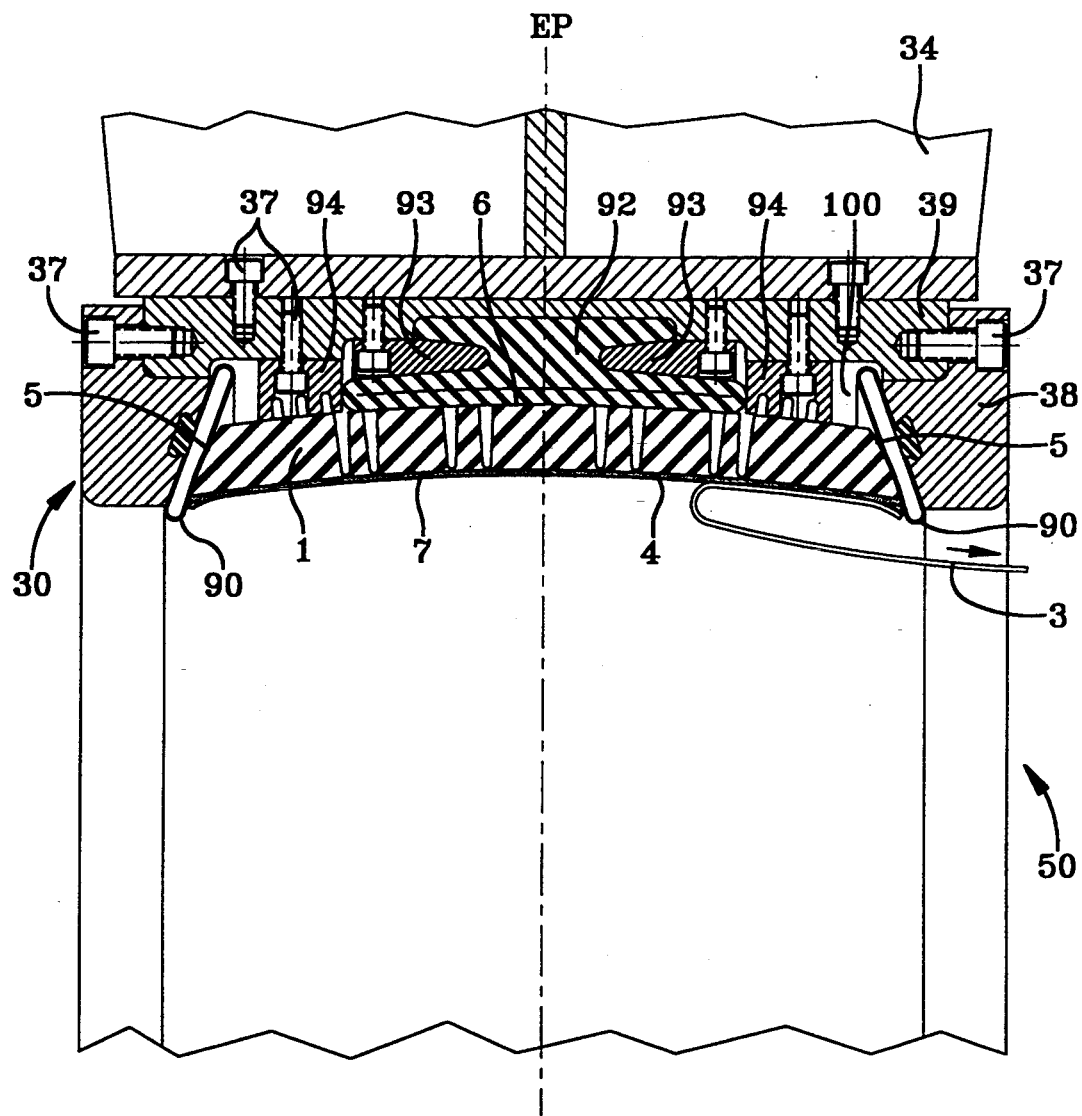
FIG. 15 is a cross sectional view of the transfer mechanism 30 with expanded tread 1 taken along lines 15—15 of FIG. 14.

The transfer mechanism 30 is then centrally positioned over the casing 2 mounted to the casing drum wheel assembly 40. In the preferred embodiment the transfer mechanism 30 is moved a fixed distance such that the tread 1 is precisely centered over the equatorial plane (EP) of the casing 2 as illustrated in FIG. 5. Prior to moving the tread 1 over the casing 2, the poly liner 3 is removed thereby exposing the tread adhesive 4 to atmospheric conditions as depicted in FIG. 15.

Figure 17:
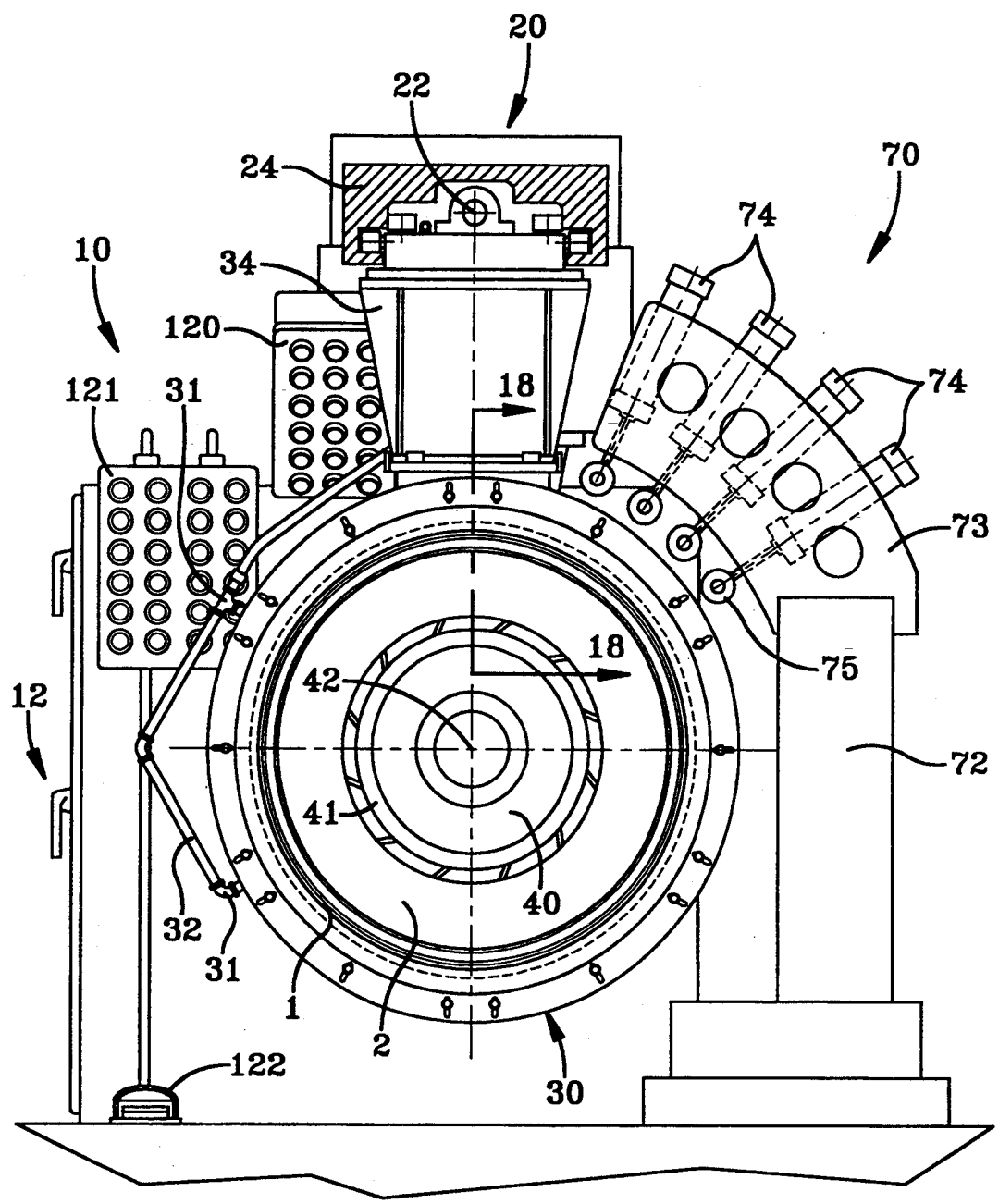
FIG. 17 is a view taken along lines 17—17 of FIG. 5.
Figure 18:
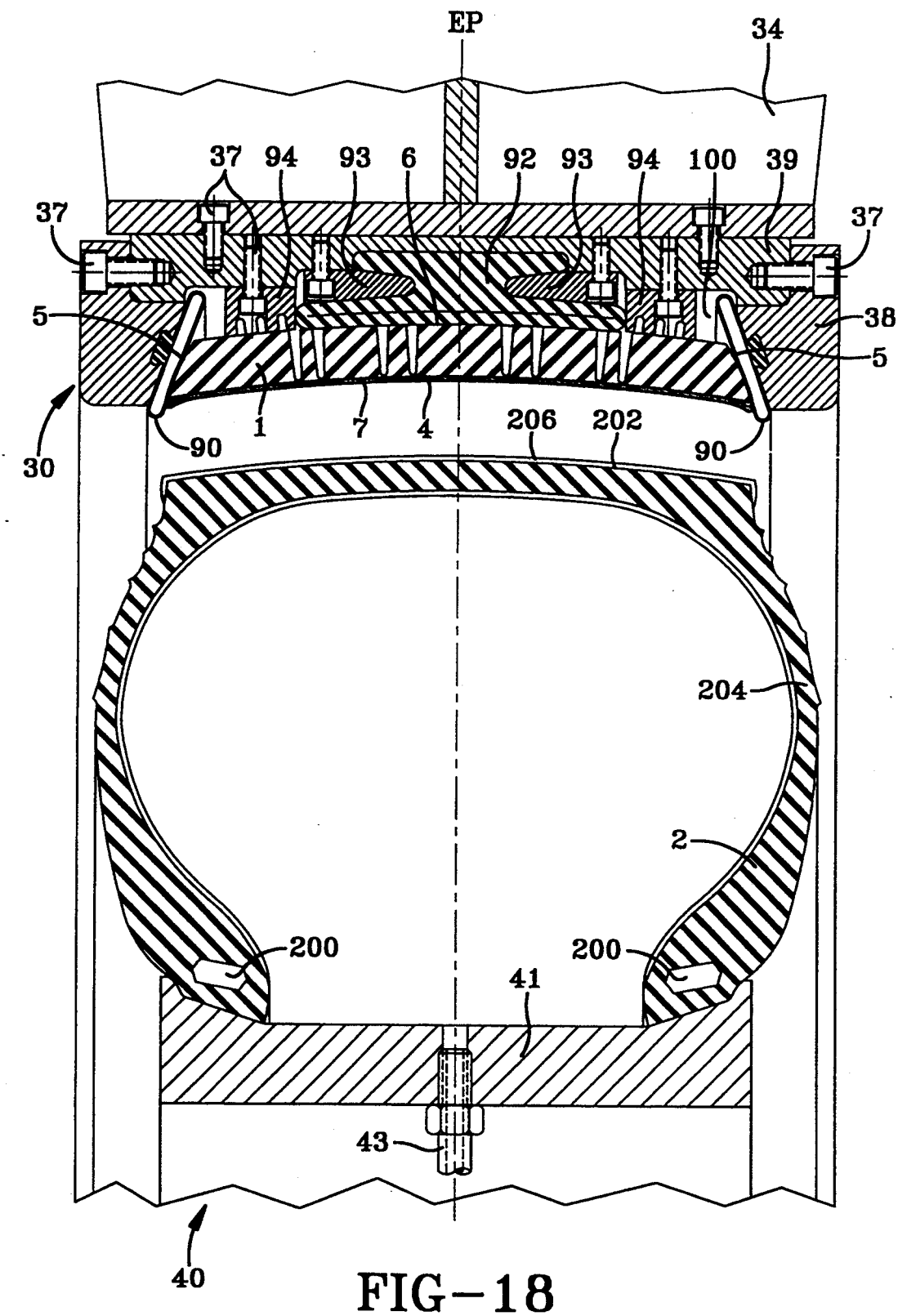
FIG. 18 is a cross sectional view taken along lines 18—18 of FIG. 17.
Figure 18A:
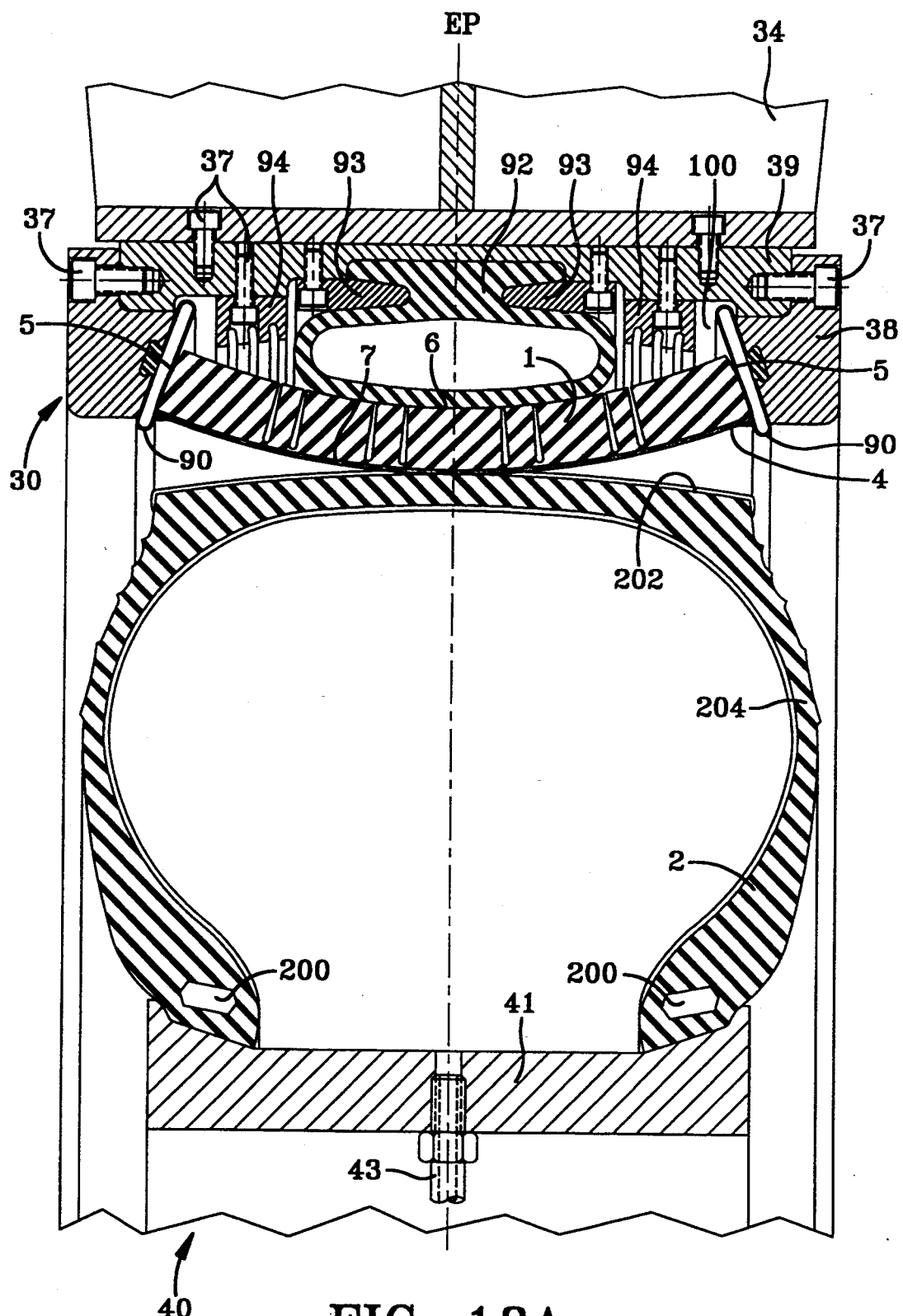
FIG. 18A is a further cross sectional view depicting the actuation of the clamping means 92.

As illustrated in FIGS. 5, 17 and 18, the transfer mechanism is designed so that the tread 1 in its expanded condition can clear the mounted casing 2. Once the transfer mechanism 30 is centered over the casing 2, the tread 1 is in proper position to be transferred to the casing. As shown in FIG. 18A, the casing 2 normally has an unvulcanized cushion gum layer 202 on the radially outer surface to which the tread 1 is to be attached. The clamping means 92 is actuated by pressurizing the center bladder. As illustrated in FIG. 18A, the center bladder circumferentially and continuously pushes on the center portion 6 of the tread 1 until it makes a direct and firm contact against the radially outer surface of the casing 2 and cushion gum layer 202. As further illustrated in FIG. 18A, the lateral edges 5 of the tread maintain firm and air tight contact with the holding means 90 while the clamping pressure is being applied. Once the tread 1 is securely adhered to the center of the casing 2 and while clamping pressure is being maintained in the center portion 6 of the tread 1, the air vacuum is ceased such that an equalization of air pressure occurs between the tread 1 and the transfer mechanism 30. As the pressure increases within the chamber 100, the seals at the lateral edges 5 disengage from the holding means 90 and the remainder of the tread firmly engage the casing. The holding means 90 has at least one annular flexible bladder. In the preferred illustration, the holding means 90 has two annular flexible bladders attached to the side portions 38 of the transfer mechanism 30. The side portions 38 and the central portion 39 in combination define an annular opening through the body of the transfer mechanism 30. The annular flexible bladders of the holding means 90 can be inflatable and the apparatus 10 can further have a means for inflating and deflating the holding means 90. The inflation of the holding means 90 increases the air tight seal that can be achieved between the tread edges 5 and the flexible bladders, as well as the holding forces. If the holding means is inflated, then upon transfer of the tread 1 to the casing after the clamping means 92 is actuated, the air chamber pressure is equalized to atmospheric pressure and the holding means is deflated allowing the remaining portion of the tread to transfer to the casing.

Figure 18B:
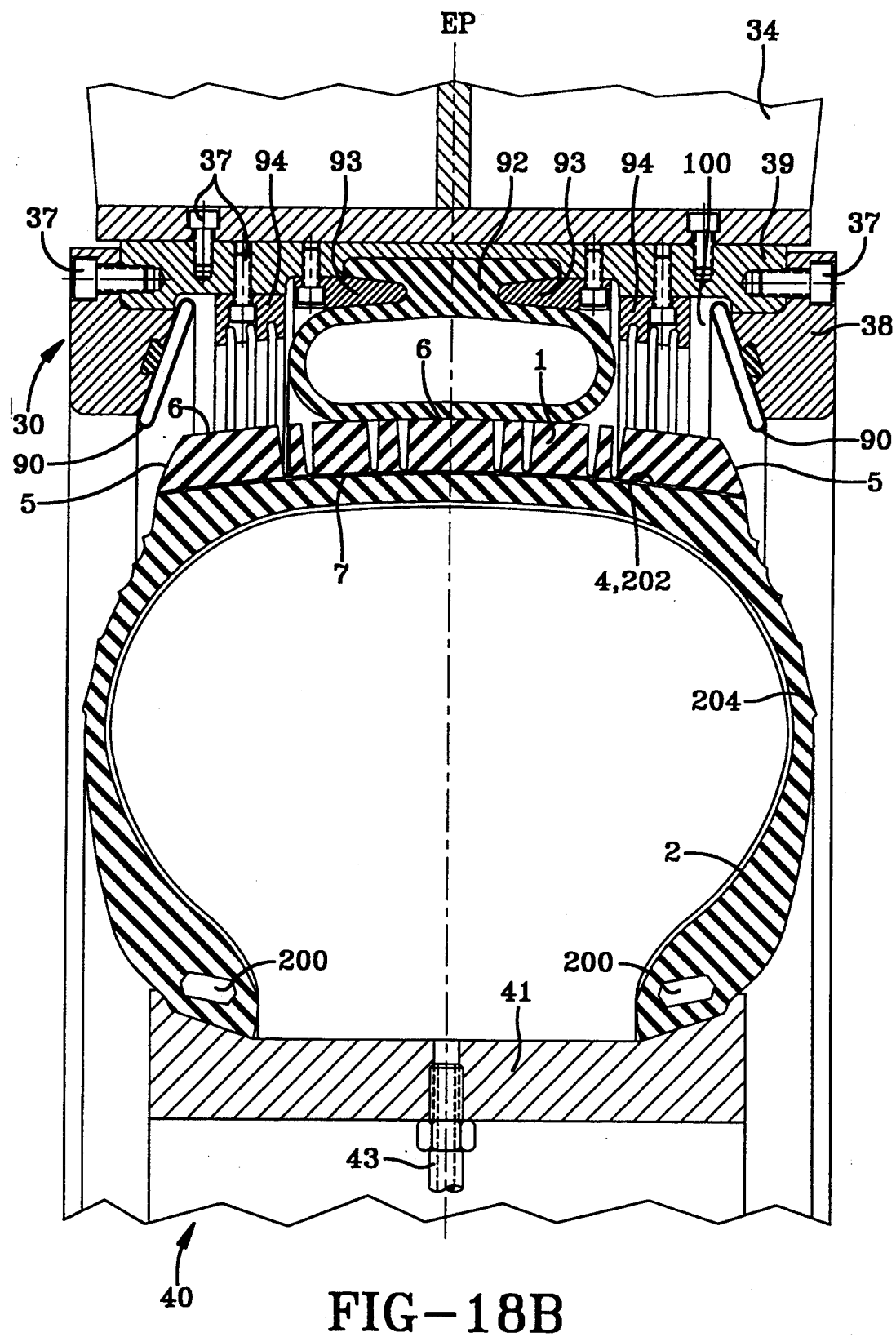
FIG. 18B is a further cross sectional view wherein the tread edges 5 are released from the transfer mechanism 30.

It may be preferable that the casing 2 be inflated to provide additional rigidity to the structure during the transfer operation. The drum wheel 41 has an air passageway and air inlet valve 43 designed to pressurize the casing if it is required as shown in FIGS. 18, 18A, and 18B.

Figure 6:
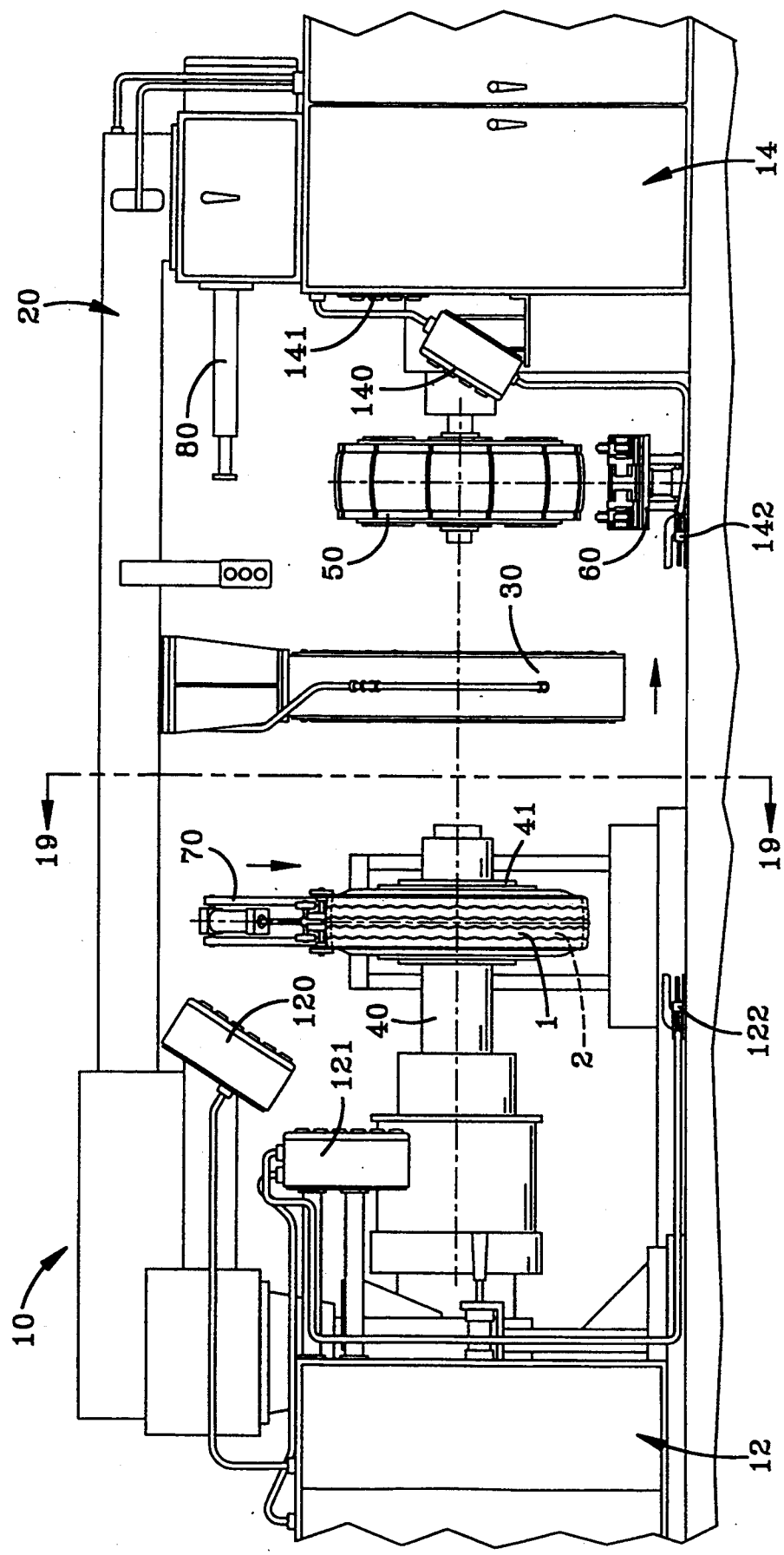
FIG. 6 is a front view of the machine 10 depicting the tread 1 mounted to the casing 2 and being stitched thereto.
Figure 7:
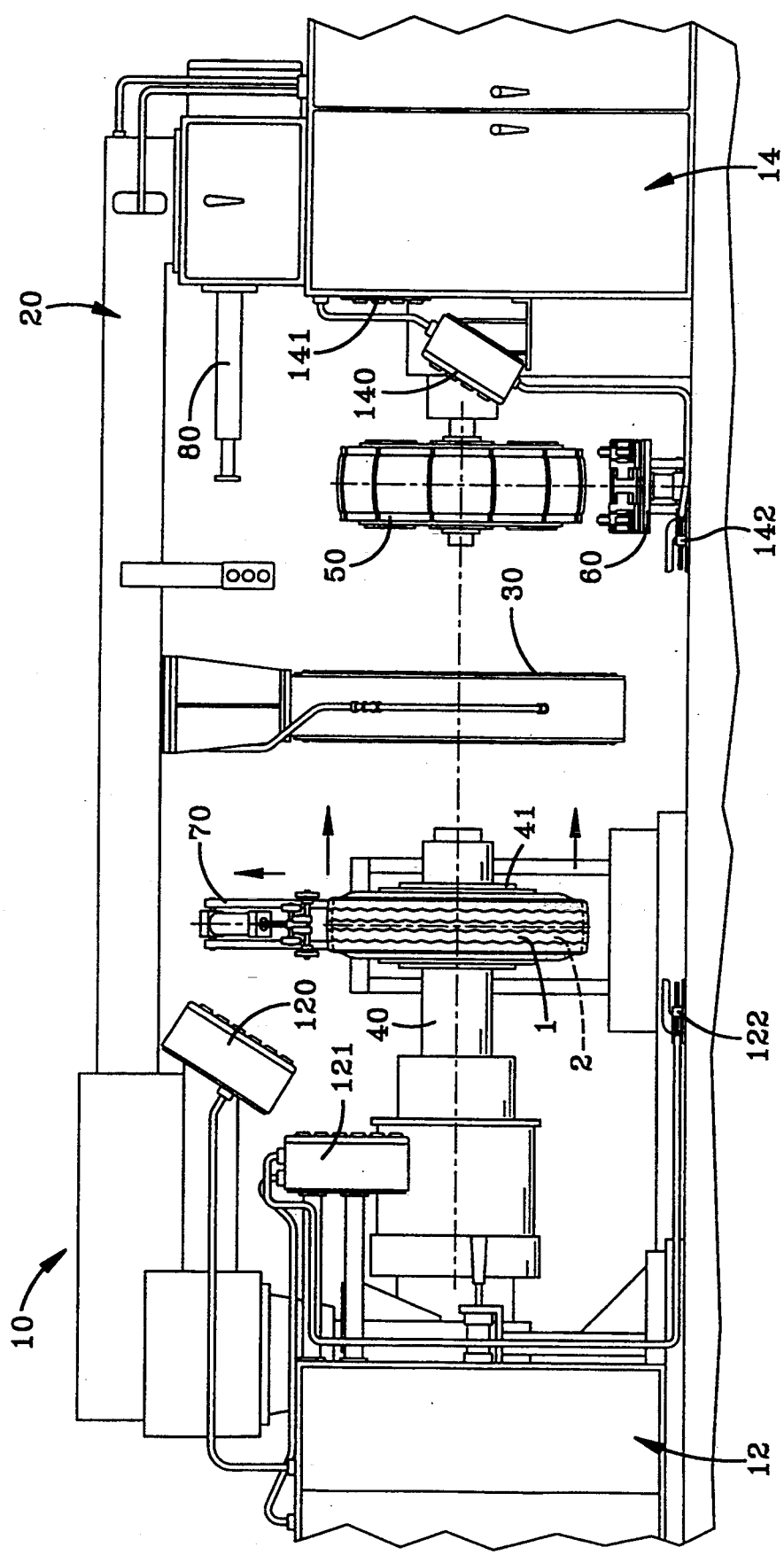
FIG. 7 is a front view of the machine 10 wherein the stitching mechanism 70 is being withdrawn from the casing.

Once the tread 1 is securely fastened to the casing 2, the clamping means 92 can be evacuated such that the clamping means 92 is withdrawn radially outwardly providing a clearance between the treaded casing 2 and the transfer mechanism 30. Once this clearance is achieved, the transfer mechanism 30 can be withdrawn as shown in FIG. 6.

Figure 19:
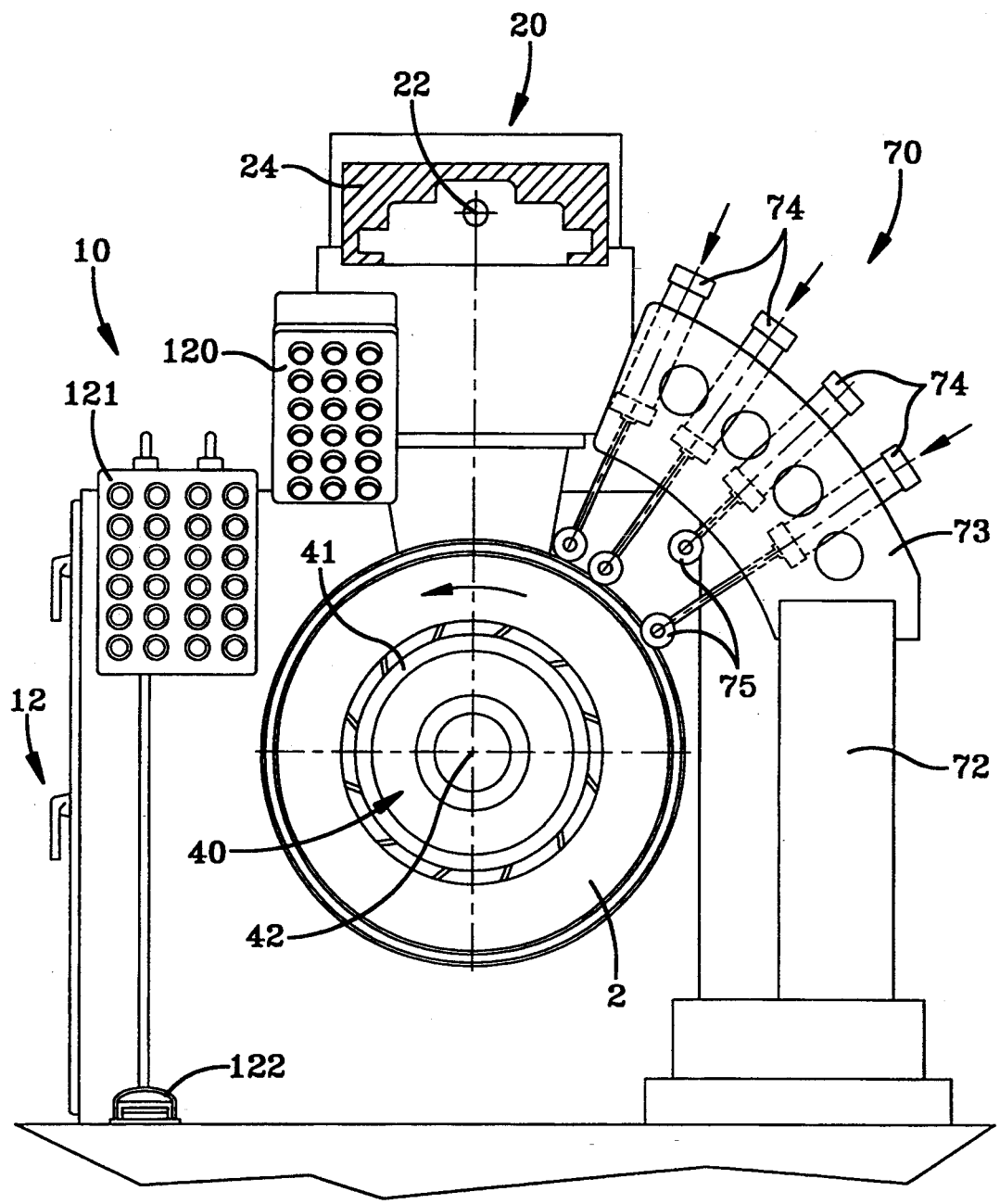
FIG. 19 is a view taken along lines 19—19 of FIG. 6.

Once the transfer mechanism 30 is positioned away from the tread casing assembly, the wheel casing drum 41 with tire mounted thereto is rotated. While the tire is rotating a stitcher mechanism 70 is brought into contact with the tread 1 applying pressure to the tread 1 to more securely bond the tread to the casing 2. After several rotations, the stitcher mechanism is pivoted away from the tread; FIG. 19 illustrates the stitching procedure. The stitching operation insures that trapped air is removed from under the casing and that the tread is securely attached to the casing.

The above description of the preferred apparatus 10 and method for transferring a tread onto a casing illustrates a method whereby the mating surfaces of a tread, which may be adhesively coated, and the casing, which may have a cushion gum layer on the surface or also may be adhesively coated, can be securely attached to one another without any physical contact by the transferring mechanism. Secondarily, by maintaining the edges 5 of the tread 1 away from the casing 2 while the central portion 6 of the tread 1 is securely positioned against the casing 2 further assists in preventing entrapped air to be caught between the tread 1 and the casing 2. Entrapment of air in the retreading operation reduces the adhesive quality between the tread and the casing and is to be avoided.

Although it is believed preferred that the center clamping means 92 be an inflatable bladder, it may also be accomplished by providing a strap or any other mechanical mechanism which can circumferentially be cinched or tightened or radially inwardly moved thereby applying a clamping force in the central region of the tread. This can be done by any number of mechanical means as an alternative to the inflatable bladder 92.

The holding means 90 on each side of the tread also may be alternatively constructed using a mechanical member such as ridges or any other mechanism that could make sealing contact with the lateral edges 5 of the tread 1. Or as a further alternative, the holding means may have a rigid member on one side to sealingly engage a lateral edge 5 of the tread 1 and an inflatable bladder on the opposite side to provide sealing force to restrain the edges of the tread. It is important, however, that the holding means be such that the centering of the tread is not altered by the holding means. Based on the foregoing description of the invention, what is claimed is:

What is claimed:

1. An apparatus for transferring a radially expanded annular tread onto a tire casing; the apparatus comprising:
   a body having an annular central portion and a pair of lateral annular sides adjacent each end of the central portion, the combination of the central portion and the sides defining an annular opening through the body;
   a means for holding the lateral edges of a radially expanded tread independent of the center of the tread, the means for holding being attached to the body at least one annular side;
   a means for circumferentially clamping the central portion of the radially outer surface of a radially expanded tread, while held at its lateral edges by said holding means, onto a casing, the means being attached to the central portion of the body.

2. The apparatus for transferring a radially expanded tread onto a tire casing as in claim 1, wherein the means for holding the lateral edges of the tread is an annular flexible bladder.

3. The apparatus for transferring a radially expanded tread onto a tire casing as in claim 2, wherein the means for holding the lateral edges of the tread is a pair of annular flexible bladders attached to each annular side of the body.

4. The apparatus for transferring a radially expanded tread onto a tire casing as in claim 1, wherein the means for clamping is an inflatable bladder.

5. The apparatus for transferring a radially expanded annular tread onto a tire casing as in claim 1, further comprises:
   a means for evacuating air from between the apparatus and the radially expanded tread.

6. The apparatus for transferring a radially expanded annular tread onto a tire casing as in claim 4, further comprises:
   a means for inflating the inflatable bladder.

7. The apparatus for transferring a radially expanded annular tread onto a tire casing as in claim 2, wherein the means for holding is a flexible bladder which is inflatable.

8. The apparatus for transferring a radially expanded annular tread onto a tire casing as in claim 7 further comprises:
   means for inflating and deflating the holding means.

9. The apparatus for transferring a radially expanded annular tread onto a tire casing as in claim 5, wherein:
   the central portion has at least one annular ring, the annular ring being circumferentially grooved and wherein the grooves communicate with the means for evacuating air.

* * * * *